Jan. 20, 1959          L. BURGESS          2,869,990
PROCESS OF PRODUCING CARBIDES
Filed April 2, 1956          2 Sheets-Sheet 1
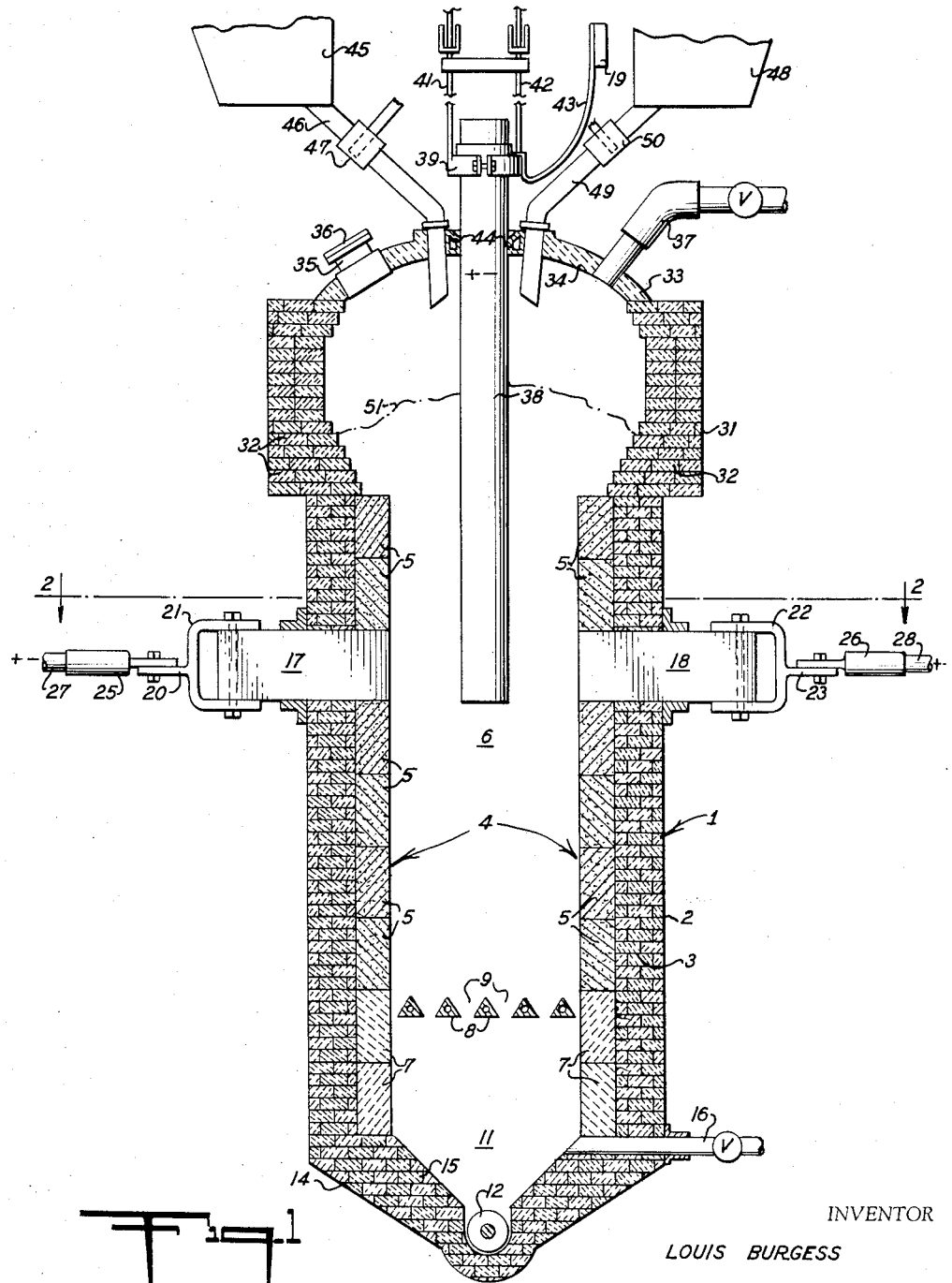
INVENTOR
LOUIS BURGESS
BY Arnold Sprung
ATTORNEY Jan. 20, 1959  L. BURGESS  2,869,990
PROCESS OF PRODUCING CARBIDES
Filed April 2, 1956  2 Sheets-Sheet 2
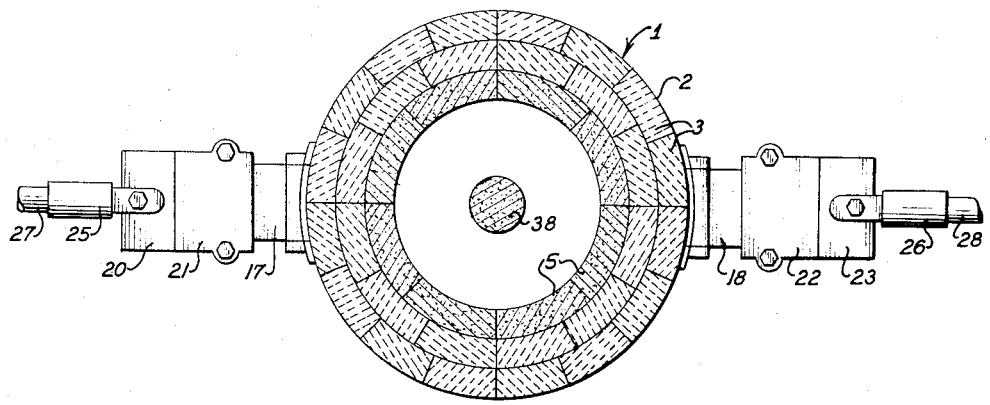
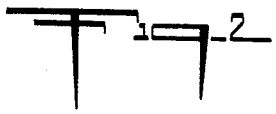
INVENTOR
LOUIS BURGESS
BY *Arnold Sprung*
ATTORNEY United States Patent Office 2,869,990
Patented Jan. 20, 1959

2,869,990

PROCESS OF PRODUCING CARBIDES

Louis Burgess, Jersey City, N. J., assignor to Sam Tour and Murray Burgess and Eddie Burgess Beitler, executors of said Louis Burgess, deceased Application April 2, 1956, Serial No. 575,567

9 Claims. (Cl. 23—208)

This invention is a continuous process of producing carbides of those elements which form carbides by electric furnace reduction of the corresponding oxide with carbon. Examples of the elements referred to are aluminum, calcium, titanium, zirconium, boron and silicon. The invention will be fully understood from the following description read in conjunction with the drawing in which:

Fig. 1 is a diagrammatic elevation of apparatus in which the invention may be carried out; and Fig. 2 is a section through the construction shown in Fig. 1 on the plane indicated by 2—2.

This electric furnace reduction is complicated by the high melting points of the carbides produced. Thus, although calcium carbide is continuously produced by reduction of the oxide with carbon in the arc type furnace, the commercial product runs only about 80% calcium carbide owing to the difficulties involved in making a product of higher calcium carbide content. A crude grade of aluminum carbide is producible by direct reduction of bauxite with carbon in the method described in my prior patent (now expired) No. 1,379,523, and while this will pool under the electrode, the melting point is so high as to render it doubtful that it could be successfully tapped. In this case the impurities present operate to reduce the melting point of the end product. With respect to the other elements mentioned, the melting points of the carbides are so high as to practically preclude any possibility of the production of these carbides in an electric furnace from which the product is removed by tapping. In general, these carbides may be produced in electric furnaces of the resistance type in which the entire charge is removed after each operation for recovery of the carbide formed.

In accordance with the instant invention, however, it is possible to produce these various carbides continuously by electric furnace reduction, removing the end product without limitation either as to the tendency of the oxide to melt or sinter, and without limitation as to the melting point of the carbide itself. The process by which I accomplish this is broadly as follows:

(a) I form individual bodies or masses of coke throughout which the oxide of the element is disseminated in the form of particles in a supporting structure of carbon. The carbon in these bodies or masses is in excess of that consumable by reduction of the oxide of the element and other reducible oxides present; it is further in excess of that which will be consumed by reaction with the element after reduction to form the corresponding carbide. The amount of this excess should be at least sufficient to carry the compressive stress of the superincumbent charge during the reduction operation and to maintain the form and structure of the individual bodies or masses, at least up to the point of complete reaction.

(b) I maintain a charge of these bodies or masses in an electric furnace at a temperature at which reduction of the oxide and formation of the carbide proceed actively, conducting away the carbon monoxide which is formed by the reduction reaction.

(c) Either intermittently or continuously I add fresh bodies or masses at the upper end of the charge so maintained, and from the lower end thereof, remove bodies or masses in which the carbide-forming reaction has proceeded to substantial completion. The fact that the excess carbon maintains the form and structure of the individual bodies or masses up to at least the completion of the carbide-forming reaction makes possible the continuous removal of the end product in solid form.

(d) During reduction a carrier gas is moved upwardly through the charge to sweep out the carbon monoxide simultaneously formed and prevent reversal of the reduction reaction in those parts of the charge which are below the zone of active reduction. If the ultimate product desired is a carbide, this carrier gas may be either hydrogen or any of the inert gases, for example argon. If however, the end product should contain nitrogen, the carrier gas may itself consist of nitrogen, in which case the fixation of the nitrogen so introduced will take place in those parts of the charge which are below the zone of active reduction, resulting in the formation of a product containing both carbon and nitrogen in solid form in a single operation.

With respect to the individual bodies or masses of coke throughout which the oxide particles are disseminated for maximum initial and residual strength with minimum excess carbon, the oxide particles should be relatively small, i. e., predominantly passing 100 mesh. This also results in the maximum speed and efficiency of the carbide-forming reaction. One method of generating the desired coke carbon structure is to admix the oxide with a substance selected from the tars, pitches and asphalts (including the oxidized asphalts) and mixtures thereof; these are residual products of distillation and not all will be satisfactory for this purpose. In general, those materials which would be satisfactory as binders for the manufacture of carbon electrodes are useable in the instant process. An empiric method of evaluating such materials is described in an article by Sharet and Bishofberger (Industrial & Engineering Chemistry, July 1955, pp. 1412–1416) in which one standard is the so-called characterization factor 1 formed by multiplying the coking value (U. S. Dept. of Commerce Publication Board PB 70028, claims 5732-98) by the atomic hydrogen ratio. A substance of the characterization factor 1 of at least 50 should be satisfactory.

Whether a particular material is satisfactory is, in any event, determinable by a relatively simple test. A sample is compounded in accordance with the instructions of the instant disclosure, briquetted under a pressure of several hundred pounds per square inch to form a briquette, the major dimension of which is not over 1½ inches, and heated gradually, in a closed but not sealed container, from normal temperatures to 800° C. for a period of about 2 hours. After cooling in the sealed container the resulting coked briquette should be firm and dense, with a strength in compression of at least 100 lbs. per square inch.

The coke-forming material and the oxide are first uniformly mixed. With materials that are freely fluid below the temperature of active pyrolysis, the amount of such material should be sufficient to occupy the spaces between the oxide particles. For the same reason less coke-forming material is required if the mix is briquetted under pressure. If an excess over this amount is used, it may separate and the carbon subsequently formed in the separated part will not envelop oxide particles or contribute to the reduction. With substances that become plastic only and not freely fluid up to the temperature of active pyrolysis, this limitation does not obtain. In any event, the coke-forming materials should be used in the minimum amounts that would yield a satisfactory coke structure, and the remainder of the carbon supplied by incorporating coke breeze anthracite, bituminous coal, etc. of substantially the same particle size as the oxide. If this is bituminous coal, it contributes the bonding effect, and in such case I have been able to achieve a satisfactory coke structure with a substance selected from the tars, pitches and asphalts having a characterization factor 1 as low as 25.

I have moreover been able to form a satisfactory coke structure using bituminous coal alone by following a novel procedure. In accordance with this, the bituminous coal and oxide are ground together to an average fineness predominantly passing 300 mesh. Before grinding the mixture of oxide and bituminous coal is gray and the individual particles of coal and oxide are distinguishable. After grinding together to the prescribed fineness, the mixture is brown to black. Individual particles of oxide and coke are no longer separately distinguishable and the coal present has acquired the property of flowing under great pressure. The exact nature of the change taking place is not yet understood. Whenever by the application of pressure of the order of 15 tons per square inch, the coal in the mixture is found to be flowable, i. e., to form a continuous monolith enveloping the oxide particles, the grinding is discontinued and the entire batch is briquetted under such pressure. The briquettes so formed resemble pitch in appearance, with the coal forming a continuous phase which envelops the oxide particles. The briquettes so formed may be coked in a continuously operating carbonizer. If in preliminary tests the briquettes manifest a tendency to stick together or deform, this can be corrected by substituting anthracite or coke for part of the bituminous coal.

With those coke-forming substances which are fluid up to the temperature of pyrolysis, the mix must be supported in a quiescent state during pyrolysis. In these cases carbonization may be effected in a coke oven or a broad oven. With either the coke oven or broad oven a period of several hours will be required to transfer the heat to those portions which are most remote from the heating surfaces. The operation can be concluded and the charge ejected when those portions most remote from the heating surfaces reach a temperature of about 700° C. although heating to a higher temperature is not prejudicial in any way.

In the drawings electric furnace 1 includes shell 2 of steel of circular cross-section provided with a lining 3 of refractory brick and an inner lining 4 of carbon blocks 5 which define the zone of reduction 6. Below the zone of reduction the inner lining is composed of refractory brick 7 and within this space the furnace is spanned by a series of water-cooled grate bars 8 which may be intermittently or continuously turned by any suitable means (not shown) in the direction indicated by arrow 9 to cause the superincumbent charge to move down into pit 11, from which it may be continuously ejected by the turning of worm conveyor 12. The lower end 13 of the furnace is sealed by cone bottom 14 provided with refractory lining 15. A gas may be introduced into the lower end of the furnace through valved pipe 16. Some of the carbon blocks (17 and 18, Fig. 2) are carried out through the side wall of the furnace, so that their upper and lower surfaces may be engaged by clamp-type electrode holders 21 and 22 terminating in projections 23 and 24, to which lugs 25 and 26 are bolted to provide electrical connection with cables 27 and 28.

Shell 2 is surmounted by shell 31 of greater cross-sectional area provided with lining 32 of refractory brick. The top of the furnace is closed by dome roof 33 with a rammed lining 34 of refractory material. The roof carries inspection hole 35 normally closed by flange 36, and also carries valve pipe 37, through which gaseous products of reduction are taken off. Center electrode 38, of carbon or graphite, is carried by electrode holder 39 supported by cables 41 and 42 and supplied with current through cables 43. The electrode enters the roof through stuffing box 44. Charge is supplied to the furnace from bin 45, through chute 46, controlled by gate 47 and from bin 48 through chute 49, controlled by gate 50.

In furnaces of the arc type, in which the reduced material forms a pool and the heat is principally generated in an arc between the lower end of the electrode (or electrodes) and the top of the melt, the voltage may be held constant and the amperage controlled by moving the electrode (or electrodes) up or down to vary the length of the arc. In furnaces of the instant type operated on a charge that remains in solid form throughout, the heat is generated throughout the charge partly by the internal resistance of the individual masses of which the charge is composed, and partly by a large number of minor arcs at points of contact. For this reason the load must be controlled by simultaneously varying both voltage and amperage. The associated transformers and electric circuit must therefore be designed for operation in this manner.

*Example 1*

As a practical example of the operation of my process in a furnace of the type described with an internal diameter of 4 ft. and kva. input of 2000 kw. I prepare a charge composed of 500 parts lime and 635 parts of bituminous coal. The coal referred to was from Elkhorn Seam Weeksbury Mine, Floyd County, Kentucky, analyzing as follows:

|  | Percent |
|---|---|
| Volatile | 36.9 |
| Fixed carbon | 57.8 |
| Ash | 5.3 |
| Sulphur | 0.5 |

The charge so formed is ground in a ball mill to predominantly pass 300 mesh and briquetted under a pressure of 15 tons per square inch to pillows of 1½" length, 1½" width and ¾" thickness.

After briquetting the charge is carbonized in a continuous carbonizer to a top temperature of 800° C. and supplied to bins 45 and 48. Its bulk density at this stage is about 113 lbs. per cubic foot. This charge is substantially completely reduced to calcium carbide in a residence time of about 15 minutes at 1900° C. and the resulting carbide is disseminated throughout a continuous sustaining structure of carbon in the form of the original briquette.

The furnace is first supplied with the carbonized briquettes up to the bottom of electrode 38, following which metallurgical coke in lump form is introduced through hole 35 to form a layer bridging the gap between the electrodes to insure the smooth flow of current in the initial stages. Following this the introduction of charge is continued to approximately the height indicated by line 51. A current of hydrogen is then introduced through valved pipe 16, and after all air initially present has been swept out through valved pipe 37 electric current is supplied and voltage and amperage regulated to provide the rated kilowattage. After that portion of the charge between the electrodes has reached a temperature of at least 1900° C., the grate bars 8 are set in operation at a rate to move about 1600 lbs. of charge downwardly through the reduction zone per hour. Fresh carbonized briquettes are introduced intermittently or continuously from bins 45 and 48 through chutes 46 and 49 to maintain the upper level at about the line 51. Material dropping through the water-cooled grate bars 8 is continuously removed by worm conveyor 12. After that part of the charge which was initially below the lower end of electrode 38 has been removed, the product is substantially pure calcium carbide disseminated throughout a continuous structure of coke carbon amounting to about ten percent of the carbide, and except insofar as broken up in passing through the grate bars 8, is still in the form of the original briquettes.

If the end product desired is calcium cyanamide, nitrogen instead of hydrogen is introduced through valved pipe 16. In this case, however, the nitrogen must be in amount stoichiometrically sufficient to react with descending carbide to form cyanamide.

*Example 2*

As a further practical example of the application of my process in a furnace of the type referred to in Example 1, I prepared a charge composed of 400 parts of rutile, 150 parts of metallurgical coke and 150 parts of bituminous coal. The rutile analyzed as follows:

| | Percent |
|---|---|
| $ZrO_2$ | 1.62 |
| $SiO_2$ | 1.22 |
| $TiO_2$ | 93.40 |
| $FeO_3$ | 2.12 |
| $Al_2O_3$ | 0.55 |
| $As_2O_3$ | 6.03 |

The coal referred to was from Pittsburgh Seam Federal No. 1 Mine, Northern West Virginia near Fairmont, analyzing as follows:

| | Percent |
|---|---|
| Volatile | 40.3 |
| Fixed carbon | 51.8 |
| Ash | 7.9 |
| Sulphur | 3.2 |

The charge so prepared is ground in a ball mill to predominantly pass 300 mesh, briquetted and carbonized as described in Example 1. Its bulk density at this stage is about 165 lbs. per cubic foot.

This charge is substantially completely reduced to titanium carbide (TiC) in a residence time of about 15 minutes at 1900° C. and the resulting carbide is disseminated throughout a continuous sustaining structure of carbon in the physical form of the original briquettes.

In general, the charging and starting of the furnace are as stated in Example 1. After that portion of the charge between the electrodes has reached a temperature of about 1900° C., the grate bars 8 are set in operation at a rate to move about 1100 lbs. of charge downwardly through the reduction zone per hour.

After continuous operation has become established, the final product is titanium carbide disseminated throughout a continuous structure of coke carbon amounting to about ten percent of the carbide and, except insofar as broken up in passing through the grate bars 8, is still in the form of the original briquettes.

*Example 3*

As a further practical example of the operation of my process in a furnace of the type referred to in Example 1, I prepare a charge composed of 600 parts of calcined bauxite and 600 parts of bituminous coal. The bauxite referred to was metal grade from Arkansas running about 70% $Al_2O_3$, balance principally silica with minor amounts of titania and ferric oxide. The coal referred to was Empire Seam Alabama analyzing:

| | Percent |
|---|---|
| Moisture | 4.5 |
| Volatile | 37.4 |
| Fixed carbon | 60.3 |
| Ash | 2.3 |
| Sulphur | 0.90 |

The charge so prepared is ground in a ball mill to predominantly pass 300 mesh, briquetted and carbonized as described in Example 1. Its bulk density at this stage is about 122 lbs. per cubic foot. The $Al_2O_3$ in this charge is substantially completely reduced to $Al_4C_3$ in a residence time of 15 minutes at 2000° C. and the resulting carbide is disseminated throughout a continuous sustaining structure of carbon in the physical form of the original briquette.

In general, the charging and starting of the furnace are as stated in Example 1. After that portion of the charge between the electrodes reaches a temperature of 2000° C. the grate bars are set in operation at a rate to move about 1100 lbs. of charge downwardly through the reduction zone per hour. After continuous operation has become established, the final product is principally aluminum carbide, with some silicon carbide and some titanium carbide resulting from impurities in the bauxite disseminated throughout a continuous structure of coke carbon, amounting to about ten percent of the carbide and, except insofar as broken upon passing through the grate bars 8, is still in the form of the original briquettes.

I claim:

1. Process for the continuous production of carbides of those metallic and metaloid elements which form carbides by electric furnace reduction of the corresponding oxides with carbon, which comprises forming a charge composed of briquetted masses in which said oxide is disseminated in the form of particles throughout a continuous supporting structure of coke carbon, said carbon being present in said masses in excess of that required for reduction of said oxide with formation of carbon monoxide, and for reaction with the said element with formation of the carbide thereof, maintaining a body of such masses within a space defined by a refractory setting, heating such body by passage of electric current through said body from electrodes in contact with said body to a temperature at which reduction proceeds with formation of carbon monoxide in gas phase and residual masses of coke carbon containing said carbide disseminated therein, adding fresh masses to said body at the top thereof and removing residual masses in solid form from the bottom thereof.

2. Process according to claim 1 in which a sweep gas is passed upwardly through said body during said reduction.

3. Process according to claim 1 in which hydrogen is passed upwardly through said body during said reduction.

4. Process for the continuous production of carbides of those metallic and metalloid elements which form carbides by electric furnace reduction of the corresponding oxides with carbon, which comprises forming a charge composed of briquetted masses in which said oxide is disseminated in the form of particles predominantly passing 100 mesh throughout a continuous supporting structure of coke carbon, said carbon being present in said masses in excess of that required for reduction of said oxide with formation of carbon monoxide, and for reaction with the said element with formation of the carbide thereof, maintaining a body of such masses within a space defined by a refractory setting, heating such body by passage of electric current through said body from electrodes in contact with said body to a temperature at which reduction proceeds with formation of carbon monoxide in gas phase and residual masses of coke carbon containing said carbide disseminated therein, adding fresh masses to said body at the top thereof and removing residual masses in solid form from the bottom thereof.

5. Process according to claim 4 in which a sweep gas is passed upwardly through said body during said reduction.

6. Process according to claim 4 in which hydrogen is passed upwardly through said body during said reduction.

7. Process for the continuous production of calcium carbide which comprises forming a charge composed of briquetted masses in which calcium oxide is disseminated, in the form of particles, throughout a continuous supporting structure of coke carbon, said carbon being present in said masses in excess of that required for reduction of said calcium oxide with formation of carbon monoxide, and for reaction with the calcium with formation of calcium carbide, maintaining a body of such masses within a space defined by a refractory setting, heating such body by passage of electric current through said body from electrodes in contact with said body, to a temperature at which reduction proceeds with formation of carbon monoxide in gas phase and residual masses of coke carbon containing calcium carbide disseminated therein, adding fresh masses to said body at the top thereof and removing residual masses in solid form from the bottom thereof.

8. Process according to claim 7 in which a sweep gas is passed upwardly through said body during said reduction.

9. Process according to claim 7 in which hydrogen is passed upwardly through said body during said reduction.

References Cited in the file of this patent

UNITED STATES PATENTS

| | | |
|---|---|---|
| 904,991 | Price | Nov. 24, 1900 |
| 1,374,317 | Norton | Apr. 12, 1921 |
| 2,380,008 | Abrams et al. | July 10, 1945 |

FOREIGN PATENTS

| | | |
|---|---|---|
| 511,945 | Great Britain | Aug. 28, 1939 |
| 501,376 | Canada | Apr. 13, 1954 |